United States Patent Office 2,961,323
Patented Nov. 22, 1960

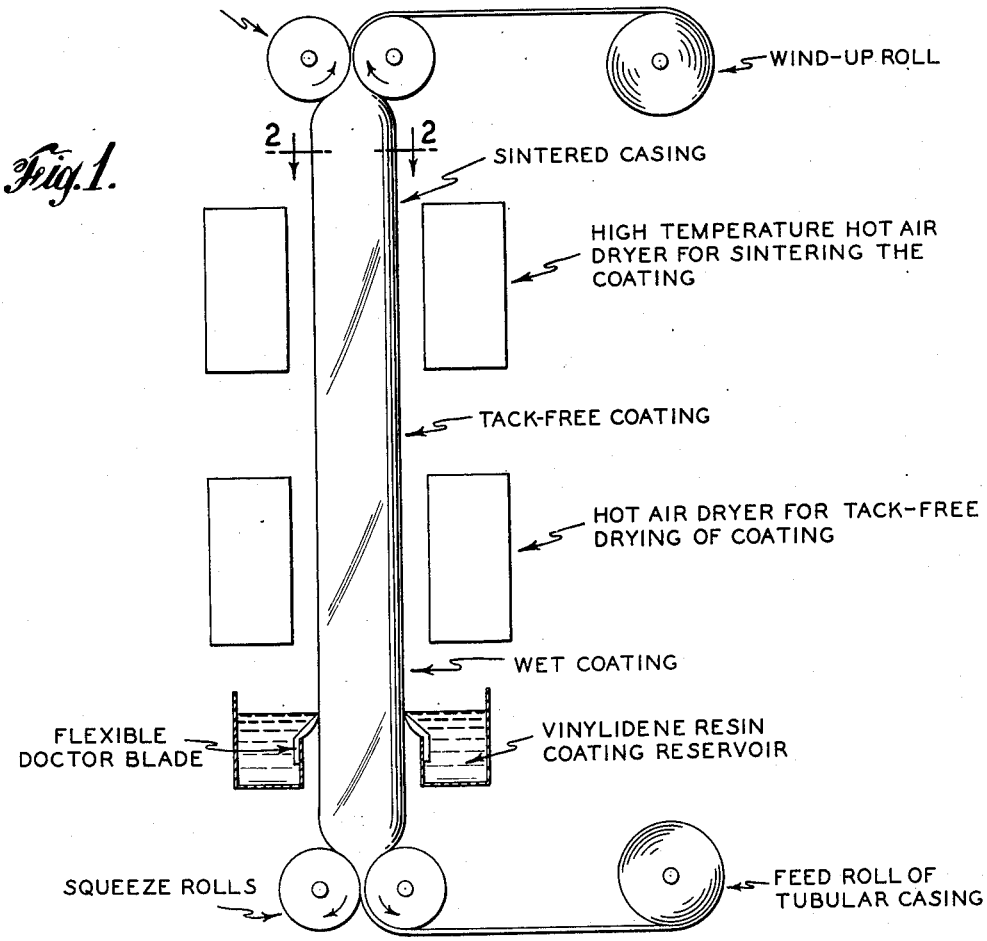
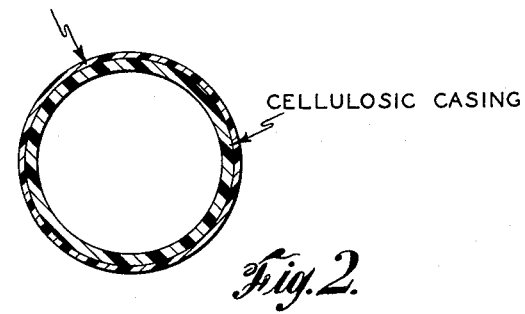

2,961,323

CASINGS AND METHOD OF MAKING SAME

William Frederick Underwood, Oak Park, and Ralph J. Signer, Villa Park, Ill., assignors, by mesne assignments, to Union Carbide Corporation, a corporation of New York Filed Oct. 12, 1955, Ser. No. 540,150

22 Claims. (Cl. 99—176)

This invention relates to casings for the meat industry. More particularly it relates to coated casings and the method of producing the same.

There are several casing applications in the meat industry where low moisture vapor transmission with or without low oxygen transmission are extremely important. Two such applications are liver sausage and ground beef. Saran film has been used effectively in the liver sausage application and to a certain extent in the fresh ground beef application, because of its moisture vapor and gas transmission characteristics. Saran film, however, has not been entirely satisfactory in these applications due particularly to difficulty in maintaining size control, high incidence of film breakage due to brittleness (particularly at low temperatures) and difficulties encountered when slicing saran-packaged items with a knife.

An object of this invention is to provide a casing for the meat industry and having a firmly adherent coating and characterized by a low moisture vapor transmission.

Another object of this invention is to provide a coated casing for the meat industry which has sufficient strength to resist stresses and tendency to change dimensions imposed by stuffing the casing with meat product, handling, and processing of the package.

An additional object of this invention is to provide a coated casing for the meat industry which will perform satisfactorily at low temperature.

A further object of this invention is to provide a coated casing which when stuffed can be sliced easily.

A still further object of this invention is to provide a method of producing coated casings having the aforementioned properties.

Other and additional objects will become apparent hereinafter.

The objects of this invention are accomplished in general by applying a thin continuous coating of a vinylidene resin to the entire external surface of a cellulosic tubing base and thereafter promoting adhesion to and formation of a continuous coating on the tubing base by subjecting the coated tubing in an inflated state to a temperature sufficiently high to sinter the resin i.e., flow and coalesce to form a continuous coating and to tenaciously adhere directly to the base tubing but below that which will deleteriously affect the base tubing or the coating.

When the coating is obtained by the application of a coating composition containing a liquid vehicle, the coated tubing, preferably in the inflated state, is appropriately heated to provide a substantially tack-free coating prior to the sintering operation.

In the accompanying drawing:

Fig. 1 is a diagrammatical representation of one form of apparatus suitable for coating the entire external surface of a cellulosic tubing base, drying the coating to a tack-free condition while the tubing is in an inflated state, and thereafter heating the dried coated tube in the inflated state to a temperature high enough to sinter the vinylidene resin;

Fig. 2 is a cross-sectional view taken along the line 2—2 of Fig. 1 of a cellulosic casing having an external sintered coating of a vinylidene resin.

Referring now to Fig. 1, tubular cellulosic casing is unwound from a feed roll and passed between the bottom squeeze rolls. The casing is inflated by trapping a volume of air in the casing between the bottom pair of squeeze rolls and the top pair of squeeze rolls. The inflated casing is conducted through a coating reservoir having a flexible doctor blade to control the thickness of the vinylidene resin coating applied to the external casing surface. The coated casing is then conveyed through a dryer wherein the coating is dried to a tack-free condition. The tack-free coated casing is then moved through a high temperature hot air dryer wherein the coating is sintered, i.e. flows and coalesces to form a continuous, tenaciously adherent coating on the casing surface. The coated casing then moves through the top pair of squeeze rolls and is taken up by a wind up roll.

A cross-sectional view of a sintered vinylidene resin coated cellulosic casing according to the invention is shown in Fig. 2.

By "vinylidene resin" is meant those film-forming resins which are obtained by the interpolymerization of polymerizable monomers at least one of which contains the vinylidene group. In general, film-forming vinylidene resins containing, by weight, in the polymer molecule at least 5% vinylidene chloride can be used. For example, vinylidene chloride polymerized with such materials as vinyl acetate; vinyl propionate; vinyl chloroacetate; vinyl chloride; vinyl bromide; alkyl acrylate or methacrylate such as methyl, ethyl, propyl, butyl, isobutyl, methoxyethyl, chloroethyl, octyl alpha-chloro, or 2-nitro-2-methylpropyl ester; methyl vinyl ketone; methyl isopropenyl ketone; acrylonitrile; methacrylonitrile; styrene; vinyl naphthalene; ethyl vinyl ether; butyl vinyl ether; N-vinyl phthalimide, N-vinyl succinimide, N-vinyl carbazole, methylene diethyl malonate; itaconic acid, etc., and the like. or mixture of two or more of these compounds. Typical and representative examples of preferred vinylidene resins which can be used are:

80% vinylidene chloride–20% acrylonitrile
50% vinylidene chloride–50% vinyl acetate
30% vinylidene chloride–70% vinyl chloride
5% vinylidene chloride–95% vinyl chloride
80% vinylidene chloride–10% vinyl acetate–10% vinyl chloride
70% vinylidene chloride–15% vinyl acetate–15% acrylonitrile It is to be understood that one or a mixture of vinylidene resins, with or without other resins, and with or without plasticizers can be used.

The precise nature of the vinylidene resin depends on the application of the product. When the coated casing is to be used for encasing meat foods such as liver sausage and fresh ground meat, vinylidene resins containing 40% or more of vinylidene chloride in the molecule are preferred.

The coating is applied directly onto the base tubing. They may be applied from aqueous or non-aqueous compositions such as dispersions, latices, emulsions, organosols or plastisols, from organic solvent or water solutions and from melts, as by dipping, by dipping followed by scraping with appropriately shaped doctor blades, by spraying, by extrusion at ordinary or elevated temperatures or in any other appropriate manner.

The coating is normally transparent. When an opaque or colored coating is desired, appropriate opaquing or coloring agents are incorporated in the coating composition.

Strength to resist the stresses and tendency to change dimensions imposed by stuffing the casing with meat products, handling and processing of the package is imparted to the product by the cellulosic tubing base. Tubing formed of regenerated cellulose, cellulose ethers such as the ethyl, propyl, hydroxy alkyl and the like ethers, and preferably such tubings reinforced with fibers such as for example those employed in the production of yoshino paper, rice paper and the like, hemp, rayon, flax, nylon, polyethylene terephthalate, acrylonitrile and the like are typical examples of base cellulosic tubings which give satisfactory results.

The cellulosic tubing can be made by any known process such as for example, by the cuprammonium, deacetylation of cellulose acetate, viscose, denitration of cellulose nitrate processes or extrusion of appropriate compositions. Cellulosic tubing reinforced with fibers can be made by the method set out in U.S. Patent Nos. 2,144,899 and 2,144,900. When the base tubing is produced by a process using viscose, it may be desulfured by well known methods to reduce the odor of the finished product.

The base tubing can be transparent, opacified, dyed, colored or printed with informational material or decorative effects before being coated. Preferably the base tubing is plasticized or softened with such materials as glycerine or glycols.

The coating is applied to the base tubing which may be in a dried, rewet or gel (never dried) state. After coating, the vehicle of the coating composition i.e., solvents or water, is removed from the film to provide a substantially tack-free condition by drying at an appropriate temperature in any suitable manner such as, for example, dielectric heating, convection heating, or preferably hot air followed by infra-red heating. In order to secure the desired size of tubing, the coated tubing is inflated to the desired size with a gaseous medium such as air and the inflated tubing subjected to the drying operation.

In general, when the coating is applied from an aqueous composition, the tubing is dried to a moisture content of less than 15%, and preferably within the range of 5–10%, by weight. When the coating composition contains a volatile solvent, the coated tubing is dried under conditions substantially removing the same. Thus for example, if methylisobutyl ketone constitutes the liquid vehicle, the coated casing is subjected to heat at 90° to 110° C. until the coating is tack-free.

In order for a coated casing for the meat food industry to give satisfactory performance, it must adhere firmly to the base so that it will withstand abrasion and not appreciably loosen, flake off, or crack upon hot water soaking and cold flexing. Extensive stuffing and processing tests have shown satisfactory packaging performance can be obtained if the coating adhesion is sufficiently good to withstand the following test: A sample of the casing is boiled in water at 100° C. for 5 minutes. A number of ½" strips of Scotch cellophane tape are then applied to the coating surface. Each piece of tape is then removed by a stripping load of 500 grams. Adhesion is considered satisfactory if not more than 3% of the area of the coating originally covered by the tape is removed by stripping.

A casing in which the coating has been dried to tack-free condition as previously explained will not meet the adhesion test previously described. After considerable research we found that satisfactory adhesion of the coating directly to the base as well as continuity of the coating will be obtained by subjecting the dried coated tubing in the inflated state to a heat treatment for a period of time and at a temperature sufficient to sinter the coating but insufficient to deleteriously affect it or the base tubing. Heat for this operation can be obtained from infrared sources, flame contact, steam-to-air heat exchange or radio-frequency dielectric dissipation. A mixture of air and hot combustion products from a gas burner is preferred because of convenience and economy.

The thickness of the coating in the product may vary depending upon the ultimate application of the coated casing. In general, coated casings of the nature herein described wherein the coating is less than .05 mil do not perform satisfactorily. However, when the coating is of a thickness greater than 0.05 mil such as for example from approximately 0.1 to approximately 0.5 mil the casings are eminently satisfactory for encasing, processing and storage of liver sausage and encasing and storage of fresh beef sausage.

The manner of practicing the invention will be more fully understood from the following illustrative examples, wherein the proportions are by weight.

Example 1

A desulphured and glycerine plasticized regenerated cellulose tubing reinforced with hemp fibers was passed through a latex containing 10 to 20% of solids, said solids essentially of 85% of a copolymer of 80% vinylidene chloride and 20% acrylonitrile, and 15% of dibutyl phthalate (the latex marketed commercially as Saran F 122–A–15 diluted with water to give 10–20% by weight of solids). The coated tubing was inflated with air to the desired diameter, and while so inflated, dried at a temperature of 80° to 120° C. to a moisture content of 10%. At this stage the coating in the resulting dried product was tack-free but it did not pass the adhesion test hereinbefore described. To increase the bonding of the coating directly to the base tubing, the dried coated tubing while still in the inflated state was then subjected to a temperature of 150° to 190° C. for 1 to 5 minutes, at which temperature the coating was sintered i.e., flowed and coalesced to form a continuous coating. Thereafter the coated tubing was cooled and finally flattened in which state it was cut into desired lengths for use as casings for the meat industry.

The sintered coating was approximately 0.1 mil thick and was firmly bonded directly to the base tubing. After being subjected to water at 100° C. for five minutes, substantially less than 3% of the area of the coating was removed when tested in accordance with the previously described adhesion test. It performed satisfactorily during stuffing with liver sausage emulsion and also during processing adn storage thereof. Under the stuffing conditions in which the coated casing stretched about 10% in circumference, saran casings stretched 25% to 40% with resultant decreased uniformity in stuffed diameter. Liver sausage encased in casings to which this invention relates can be sliced more easily than liver sausage encased in saran casings. During storage for three weeks at 40° F. and 55% relative humidity, the coating did not crack or flake off and the encased liver sausage showed a loss in weight of approximately 1 to 2% and with no indication of brown ring formation. Liver sausage encased in casing formed of uncoated base tubing stored under the same conditions and for the same time showed a loss in weight of 12%–17% and an unsightly brown ring formation.

Example 2

Same as Example 1 except that desulphured, glycerine-plasticized regenerated tubing is used in place of the reinforced tubing.

Example 3

Same as Examples 1 and 2 except that instead of using the latex, a 10–20% solution of the copolymer in methyl isobutyl ketone is used and the inflated coated tubing is dried to substantially tack-free condition at 90°–110° C. before sintering.

Example 4

Same as Example 1 except that instead of the latex a 10–20% solution of the copolymer in methyl ethyl ketone is used and the inflated coated tubing is dried at 50°–80° C. to substantially tack-free condition before sintering.

Because of the low oxygen transmission, the casings of this invention are admirably suited for encasing fresh ground meat. Fresh ground meat encased in these casings retained their pleasing red color after storage for three days.

Though the casings are particularly suitable for encasing liver sausage and fresh ground meat they can be used wherever low gas transmission and low moisture vapor transmission are required.

The coated tubing is dried to tack-free condition and sintered while it is in an inflated state. If desired the tubing may be flattened between these two operations or the inflated tubing may be successively subjected to the two heating operations.

Since it is obvious that various changes and modifications may be made in the above description without departing from the nature or spirit thereof, this invention is not restricted thereto except as set forth in the appended claims.

We claim:

1. A method of making coated casings of improved physical characteristics and suitable for the encasing, processing, and storage of foods including liver sausage and ground beef which comprises externally coating a cellulosic tubing with an amount of a composition comprising a film-forming vinylidene resin containing at least 5% by weight of vinylidene chloride in the molecule to provide a dried and sintered coating having a thickness within the range of 0.1 to 0.4 mil, treating the coated tubing in an inflated state until the coating is substantially tack-free, and then treating the coated tubing in the inflated state to cause the coating to tenaciously adhere directly to and form a continuous coating on the cellulosic tubing by heating the inflated tubing to a temperature and for a time sufficient to sinter the coating but insufficient to deleteriously affect the coating or cellulosic tubing.

2. A method as set forth in claim 1 wherein the cellulosic tubing is reinforced with fibers.

3. A method as set forth in claim 1 wherein the coating is applied from a composition having a liquid vehicle and the coated tubing in the inflated state is heated until the coating is substantially tack-free before sintering the coating.

4. A method as set forth in claim 1 wherein the cellulosic tubing is reinforced with fibers, the coating is applied from a liquid vehicle, and the inflated coated tubing heated until the coating is substantially tack-free before sintering the coating.

5. A method as set forth in claim 1 wherein the coating is applied from an aqueous latex, and the inflated coated tubing heated until the moisture content is less than 15% by weight before sintering the coating.

6. A method as set forth in claim 1 wherein the cellulosic tubing is reinforced with fibers, the coating is applied from an aqueous latex, and the inflated coated tubing heated until the moisture content is less than 15% by weight before sintering the coating.

7. A method as set forth in claim 1 wherein the coating is applied from a solution in a solvent and the inflated coated tubing heated until the coating is substantially tack-free before sintering the coating.

8. A method as set forth in claim 1 wherein the cellulosic tubing is reinforced with fibers, the coating applied from a solution in a solvent and the inflated coated tubing heated until the coating is substantially tack-free before sintering the coating.

9. A method of preparing coated casings of improved physical characteristics and suitable for the encasing, processing, and storage of foods including liver sausage and ground beef which comprises externally coating a regenerated cellulose tubing with an amount of a composition comprising a film forming vinylidene resin containing at least 5% by weight of vinylidene chloride in the molecule to provide a dried and sintered coating having a thickness within the range of 0.1 to 0.4 mil, treating the coated tubing in an inflated state to make the coating substantially tack-free, and then treating the coated tubing in the inflated state to cause the coating to tenaciously adhere directly to and form a continuous coating on the regenerated cellulose tubing by heating the inflated tubing to a temperature of 150°–190° C. for 1–5 minutes.

10. A method as set forth in claim 9 wherein the regenerated cellulose tubing is reinforced with fibers.

11. A method as set forth in claim 9 wherein the coating is applied from a composition having a liquid vehicle and the coated tubing in the inflated state is heated until the coating is substantially tack-free before sintering the coating.

12. A method as set forth in claim 9 wherein the regenerated cellulose tubing is reinforced with fibers, the coating is applied from a liquid vehicle, and the inflated coated tubing heated until the coating is substantially tack-free before sintering the coating.

13. A method as set forth in claim 9 wherein the coating is applied from an aqueous latex, and the inflated coated tubing heated until the moisture content is less than 15% by weight before sintering the coating.

14. A method as set forth in claim 9 wherein the regenerated cellulose is reinforced with fibers, the coating is applied from an aqueous latex, and the inflated coated tubing heated until the moisture content is less than 15% by weight before sintering the coating.

15. A method as set forth in claim 9 wherein the coating is applied from a solution in a solvent and the inflated coated tubing heated until the coating is substantially tack-free before sintering the coating.

16. A method as set forth in claim 9 wherein the regenerated cellulose tubing is reinforced with fibers, the coating applied from a solution in a solvent and the inflated coated tubing heated until the coating is substantially tack-free before sintering the coating.

17. A method of preparing coated casings of improved physical characteristics and suitable for the encasing, processing, and storage of foods including liver sausage and ground beef which comprises coating a regenerated cellulose tubing reinforced with an amount of fibers with an aqueous composition containing a film forming vinylidene resin containing 80% vinylidene chloride and 20% acrylonitrile in the molecule to provide a dried and sintered coating having a thickness within the range of 0.1 to 0.4 mil, treating the coated tubing in an inflated state to make the coating substantially tack-free and then subjecting the coated tubing in an inflated state to a temperature to cause the coating to tenaciously adhere to and form a continuous coating on the regenerated cellulose tubing but insufficient to deleteriously affect the coating or said regenerated cellulose tubing by heating the inflated tubing to a temperature of 150° C.–190° C. for 1–5 minutes.

18. A casing suitable for the encasing, processing and storage of food products including liver sausage and ground beef comprising a cellulosic base tubing having a sintered continuous external coating of a vinylidene resin containing at least 5% by weight of vinylidene chloride in the molecule, said coating being of a thickness within the range of 0.1–0.5 mil and adhering directly to the outer surface of said base tubing with such tenacity that not more than 3% of an area thereof subjected to boiling water at 100° C. for 5 minutes will be removed by applying and stripping a ½" strip of cellophane tape with a stripping load of 500 grams.

19. A casing as set forth in claim 18 wherein the film forming constituent coating consists essentially of a vinylidene resin containing at least 80% vinylidene chloride and 20% acrylonitrile in the molecule.

20. A casing as set forth in claim 18 wherein the cellulosic tubing base is a seamless regenerated cellulose tubing.

21. A casing as set forth in claim 18 wherein the cellulosic base tubing is a seamless regenerated cellulose reinforced with fibers.

22. A casing as set forth in claim 18 wherein the cellulosic tubing base is a seamless regenerated cellulose tubing reinforced with fibers and the film forming constituent of the coating consists essentially of a vinylidene resin containing at least 80% vinylidene chloride and 20% acrylonitrile.

References Cited in the file of this patent

UNITED STATES PATENTS

| | | |
|---|---|---|
| 2,210,436 | Weingand et al. | Aug. 6, 1940 |
| 2,338,266 | Skoning | Jan. 4, 1944 |
| 2,401,774 | Reichel | June 11, 1946 |
| 2,460,480 | Wolff | Feb. 1, 1949 |
| 2,541,167 | Pitzl | Feb. 13, 1951 |
| 2,607,696 | Kunz | Aug. 19, 1952 |
| 2,773,781 | Rodman | Dec. 11, 1956 |
| 2,864,708 | Tebben | Dec. 16, 1958 |

FOREIGN PATENTS

| | | |
|---|---|---|
| 692,154 | Great Britain | May 27, 1953 |
| 714,275 | Great Britain | Aug. 25, 1954 |